Aug. 7, 1923.
L. T. BERRY
1,464,236
WINDSHIELD CLEANER
Filed April 1, 1922
2 Sheets-Sheet 1
Fig. 1.
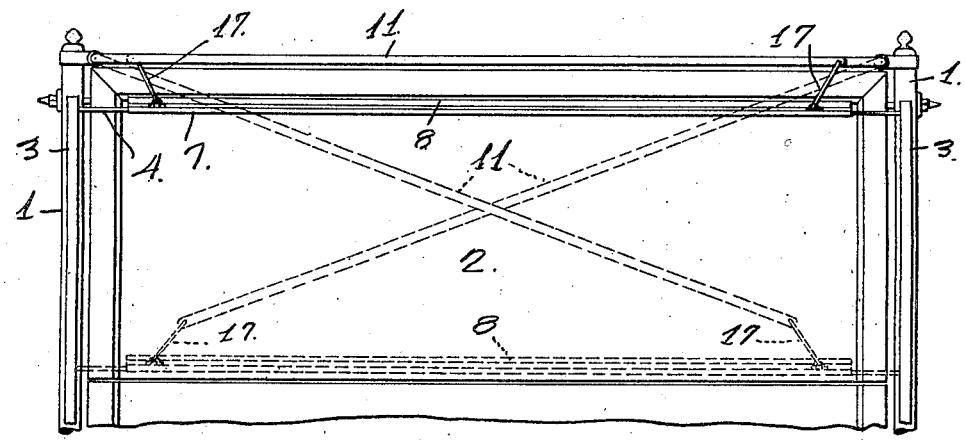
Fig. 2.
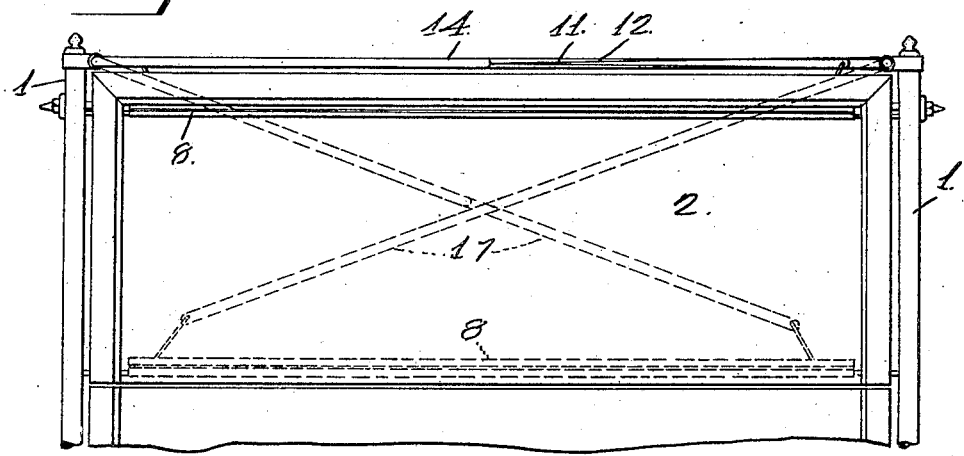
Fig. 3.
Fig. 7.
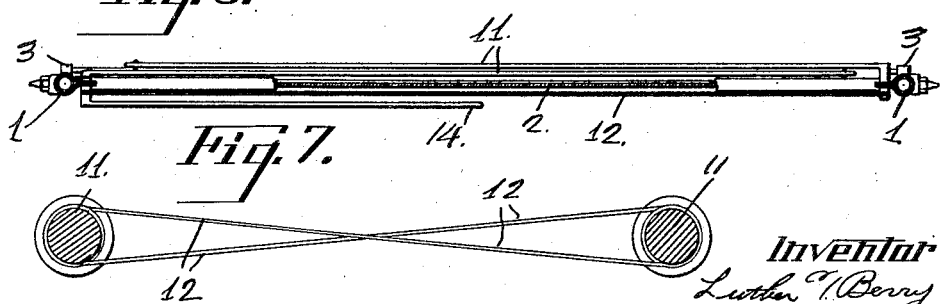
Inventor
Luther T. Berry
By Arthur L. Slee
Atty.

Aug. 7, 1923.
L. T. BERRY
WINDSHIELD CLEANER
Filed April 1, 1922
1,464,236
2 Sheets-Sheet 2
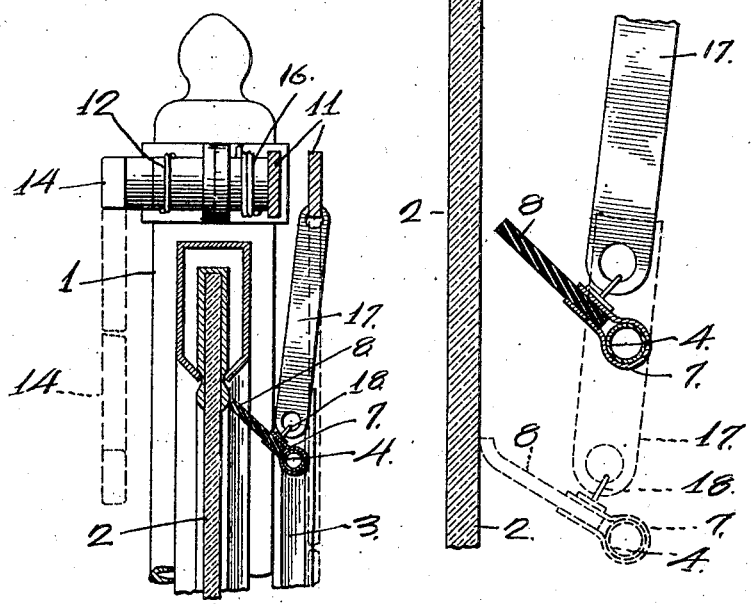
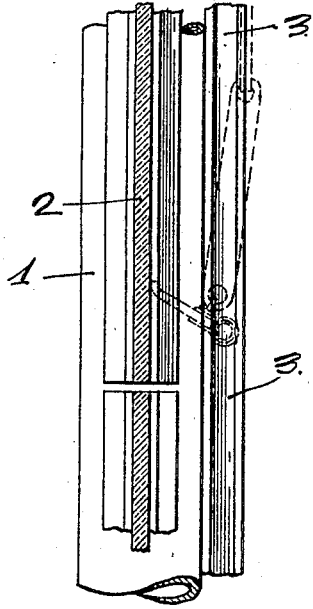
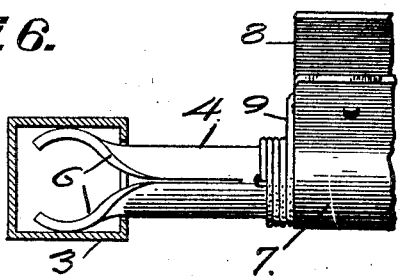
Inventor
Luther T. Berry.
By Arthur L. Slee
Atty.

Patented Aug. 7, 1923.

1,464,236

UNITED STATES PATENT OFFICE.

LUTHER T. BERRY, OF SAN FRANCISCO, CALIFORNIA.

WINDSHIELD CLEANER.

Application filed April 1, 1922. Serial No. 548,851.

*To all whom it may concern:*

Be it known that I, LUTHER T. BERRY, a citizen of the United States, residing in the city and county of San Francisco and State of California, have invented a new and useful Improvement in a Windshield Cleaner, of which the following is a specification.

My invention relates to improvements in windshield cleaners for motor vehicles, street car windows and locomotive cab windows and the like, wherein a squeegee is mounted for rapid vertical movement over the outer surface of said windshield or window.

The primary object of the present invention is to provide a new and improved windshield cleaner;

Another object is to provide a new and improved device of the character described which may be readily adapted to open or closed cars of the motor vehicle type;

A further object of the invention is to provide a windshield cleaner which may be easily and rapidly operated with a minimum effort;

A still further object is to provide a new and improved device of the character described which may be quickly and cheaply manufactured, having few parts and a maximum efficiency;

The invention resides in the particular arrangement of the parts as disclosed in the specification and claims appended hereto and disclosed in the drawings forming a part of the present specification wherein like characters are used to designate similar parts throughout the said drawings and specifications, and in which:

Fig. 1 is a broken front elevation of a windshield of a motor vehicle disclosing my improved device applied thereto;

Fig. 2 is a rear elevation of Fig 1;

Fig 3 is a broken plan view of Fig 2;

Fig 4 is an enlarged broken vertical sectional view of a wind shield disclosing my improved device attached thereto;

Fig 5 is an enlarged broken detail, in vertical section, disclosing in full lines the manner in which the rubber edge of the squeegee is held in spaced relation to the front surface of the glass and in dotted lines, the manner in which said rubber edge is moved into contact with said glass during the downward stroke of said squeegee;

Fig. 6 is an enlarged broken detailed view; partly in section, disclosing the arrangement of the spring for normally retaining the rubber edge in spaced relation to the glass; and Fig 7 is an enlarged detailed view disclosing the manner in which the operating levers are connected to move in unison.

Referring to the drawings the numeral 1 is used to designate the side standards of a windshield 2 having slotted guide members 3 mounted upon each of said members or standards 1 with their slotted sides facing inwardly. A horizontally disposed rod or tubular member 4 has its ends slidably mounted within the slotted guide members 3, said ends being split and separated as at 6 so that the bifurcations thereof may frictionally engage the inner sides of the slotted members 3 to normally resist movement of said rod 4.

A sleeve 7 is rotatably mounted upon the rod 4 and carries the rubber strip 8 which forms the squeegee. The sleeve 7 and rubber strip 8 thereof are normally held in spaced relation to the glass or windshield 2 by means of a suitable coil spring 9 mounted upon the rod 4 and having one end bearing on the sleeve 7 to hold the rubber strip away from said windshield 2.

An arm 11 is pivotally mounted upon the standards 1 at each end of the upper portion of the windshield 2, said arms each extending toward the pivot of the other arm and arranged in parallel relation to each other as disclosed in Fig. 3 of the drawings. The hub or pivotal portion of each arm 11 is operatively connected to the other by means of a crossed cord, belt or cable 12 so that when one arm is moved downwardly or upwardly, by means of an extension 14 connected to one of the arms and arranged on the inner side of the windshield 2, that the other arm 11 will move in the same direction simultaneously with said other arm.

A spring 16 is positioned on the hub portion of one of the arms 11 and is adapted to normally retain both arms 11 in an upper position with the squeegee 8 at the upper portion of the windshield 2.

The free ends of the arms 11 are operatively connected to adjacent ends of the sleeve 7 by means of suitable links 17, said links being rather loosely connected on the lower ends to said sleeve 7 by means of suitable eyelets 18.

In operation, the squeegee 8 being mounted for vertical movement over the outer face of the windshield 2, said squeegee is moved downwardly over said windshield by lowering the extension 14 on the inside of the windshield 2 and as this extension is connected to one of the arms 11 said arm 11 is lowered and through the medium of the crossed cord or cable 12 the other arm 11 is lowered simultaneously.

The first portion of the downward movement of the free ends of the arms 11 will move the rubber edge or strip 8 from its spaced relation to the windshield 2, as disclosed in full lines in Fig. 5 of the drawings, into contact with said windshield as disclosed in dotted lines in the same figure, the sleeve 7 readily turning upon the rod 4 for the reason that said rod is normally held against movement by means of the frictional engagement of its split ends 6 with the inner surfaces of the slotted members 3. Further downward movement of the free ends of the arms 11 will move the edge of the rubber strip 8 over the outer surface of the windshield 2 and thereby remove moisture from said surface.

When the extension 14 of the arm 11 is released the spring 16 will move both arms 11 upwardly, the first portion of said movement moving the rubber strip 8 away from the windshield 2, said movement being assisted by the tension of the springs 9 and the frictional engagement of the split ends 6 of the rod 4.

It is obvious that the hereinbefore described device may be readily adapted to either open or closed motor vehicles with equal facility, or to cab windows of locomotives or motormen's windows on street cars, or to any other window exposed to the elements where a clear vision is essential.

Having thus described my invention what I claim as new and desire to secure by Letters Patent is:

1. A windshield cleaner comprising a pair of vertically disposed slotted guides mounted upon either side of said windshield; a squeegee having its ends slidably mounted within said guides and extending across the outer face of said windshield; means for normally retaining the rubber edge of said squeegee in spaced relation to the glass of said windshield; an arm pivotally mounted upon each side of the windshield and having its free end operatively connected to the squeegee and arranged to move the rubber edge into contact with said glass and downwardly over the outer surface thereof.

2. A windshield cleaner comprising a pair of vertically disposed slotted guides mounted upon either side of said windshield; a squeegee having its end slidably mounted within said guides and extending across the outer face of said windshield; means for normally retaining the rubber edge of said squeegee in spaced relation to the glass of said windshield; an arm pivotally mounted upon each side of the windshield and having its free end operatively connected to the squeegee and arranged to move the rubber edge into contact with said glass and downwardly over the outer surface thereof; and means positioned on the inner side of the windshield and operatively connected to said levers whereby said squeegee may be actuated from the inner side of the windshield.

3. A windshield cleaner comprising a pair of vertically disposed slotted guides mounted upon either side of said windshield; a squeegee having its ends slidably mounted within said guides and extending across the outer face of said windshield; means for normally retaining the rubber edge of said squeegee in spaced relation to the glass of said windshield; an arm pivotally mounted upon each side of the windshield and having its free end operatively connected to the squeegee and arranged to move the rubber edge into contact with said glass and downwardly over the outer surface thereof; means operatively connecting the levers and arranged to move one lever in synchronism with the other; and means for actuating both levers for moving the squeegee downwardly over the outer surface of the windshield.

In witness whereof I hereunto set my signature.

LUTHER T. BERRY.